(12) United States Patent
Ybanez

(10) Patent No.: US 6,193,293 B1
(45) Date of Patent: Feb. 27, 2001

(54) APPARATUS FOR SECURING AND CARRYING BOX-SHAPED CARGO

(76) Inventor: Danilo Ybanez, 439 S. Saint Andrews Pl. #21, Los Angeles, CA (US) 90020

( * ) Notice: Subject to any disclaimer, the term of this patent is extended or adjusted under 35 U.S.C. 154(b) by 0 days.

(21) Appl. No.: 09/531,444

(22) Filed: Mar. 20, 2000

(51) Int. Cl.[7] ................................ A45F 5/00; B65D 63/18
(52) U.S. Cl. ......................... 294/152; 294/157; 294/165
(58) Field of Search ..................... 294/74, 138, 149, 294/150, 152–157, 165; 190/115–117; 224/250, 257, 259, 602

(56) References Cited

U.S. PATENT DOCUMENTS

| | | | |
|---|---|---|---|
| 618,333 | * | 1/1899 | Colteryahn et al. ................ 294/157 |
| 889,042 | | 5/1908 | Powers .................................. 24/273 |
| 925,986 | | 6/1909 | Blackburn ............................ 294/157 |
| 1,530,391 | | 3/1925 | Miller .................................. 24/17 R |
| 1,677,583 | | 7/1928 | Cromwell, Jr. ....................... 383/20 |
| 1,847,501 | * | 3/1932 | Stahler ................................ 294/157 |
| 2,687,321 | | 8/1954 | Toffolon .............................. 294/74 |
| 3,315,857 | * | 4/1967 | Eclov .................................. 294/152 |
| 3,337,102 | | 8/1967 | Shannon ............................. 294/168 |
| 4,489,815 | | 12/1984 | Martinez et al. ....................... 190/1 |
| 5,579,966 | * | 12/1996 | Krumweide et al. ............ 294/157 X |
| 5,665,409 | | 9/1997 | Drewry ................................ 426/132 |

* cited by examiner

Primary Examiner—Johnny D. Cherry

(57) ABSTRACT

An apparatus adapted for securing and carrying box-shaped cargo, that allows the ready transportation of boxes through airports, train stations, bus terminals, and all other like applications. The apparatus generally comprises a pair of retaining straps, a pair of horizontally disposed straps disposed to form adjustable loops, a pair of securing straps also disposed to form adjustable loops, and a pair of handles. The retaining straps surround and support the sides and bottom surfaces of the box. The horizontally disposed straps secure the front, rear, and side surfaces of the box. The securing straps secure the front, rear, bottom, and top surface of the box. A cross strap transverses the box between its side surfaces and is disposed perpendicularly to the securing straps. Once secure by the apparatus, a box may be easily toted around by use of the handles, thereby facilitating transport of such box-shaped cargo.

13 Claims, 5 Drawing Sheets

APPARATUS FOR SECURING AND CARRYING BOX-SHAPED CARGO

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to cargo transport, and more particularly to, an apparatus for securing and carrying box-shaped cargo.

2. Description of the Background Art

Corrugated-type cardboard boxes and cartons are widely used for the storage, packing, and transportation of valuable articles. Many people also use such boxes and cartons as luggage during travel, as can be noticeably seen at airports, train stations, and bus depots. The prevailing reasons for such widespread usage for these boxes and cartons is their availability, reusability, low cost, and overall ruggedness.

Despite the many advantages of using boxes and cartons as luggage, it has some inherent limitations. Boxes or cartons generally do not have handles, which makes carrying them somewhat difficult. Moreover, oversized boxes may be unwieldy and difficult to manage, especially when containing fairly heavy items therein.

To provide any semblance of security to the items contained within the box, the box must typically be stapled, taped, or both, and even wrapped with plastic. This makes it inconvenient if ready access to the items contained therein is desired, since the relatively permanent nature of these remedies means that the box can be opened only by tearing them, thereby making repacking and/or resealing difficult. Also, due to such activity, the boxes generally become tattered and unsightly, or in the event the box is dropped and ruptures, the items contained within the box may be spilled out, resulting in their damage or destruction.

To alleviate the inherent drawbacks with using boxes or cartons for the storage, packing, and transportation of valuable articles, carrying apparatuses were developed. Although these cargo carrying apparatuses do offer some assistance, there are still some shortcomings.

Accordingly, there is a need for an apparatus for securing and carrying box-shaped cargo that is lightweight and durable, that is easily securable to and removable from its cargo, that is economical to manufacture and can be stored virtually anywhere when not in use.

BRIEF SUMMARY OF THE INVENTION

The present invention pertains to an apparatus adapted for securing and carrying box-shaped cargo, that allows the ready transportation of boxes through airports, train stations, bus terminals, and all other like applications. The apparatus generally comprises a pair of retaining straps, a pair of horizontally disposed straps disposed to form adjustable loops, a pair of securing straps also disposed to form adjustable loops, and a pair of handles. The retaining straps surround and support the sides and bottom surfaces of the box. The horizontally disposed straps secure the front, rear, and side surfaces of the box. The securing straps secure the front, rear, bottom, and top surface of the box. A cross strap transverses the box between its side surfaces and is disposed perpendicularly to the securing straps.

The straps are preferably fabricated from nylon webbing and are looped together using reinforced buckles and slide fasteners. Once secured by the apparatus, a box may be easily toted around by use of the handles, thereby facilitating transport of such box-shaped cargo.

An object of the invention is to facilitate the transportation of box-shaped cargo.

Another object of the invention is to provide an apparatus for easily securing box-shaped cargo.

Another object of the invent ion is to provide a carrying and transporting apparat us that is lightweight and economical.

Still another object of the invention is to provide a carrying and transporting apparatus capable of being easily stored when not in use.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
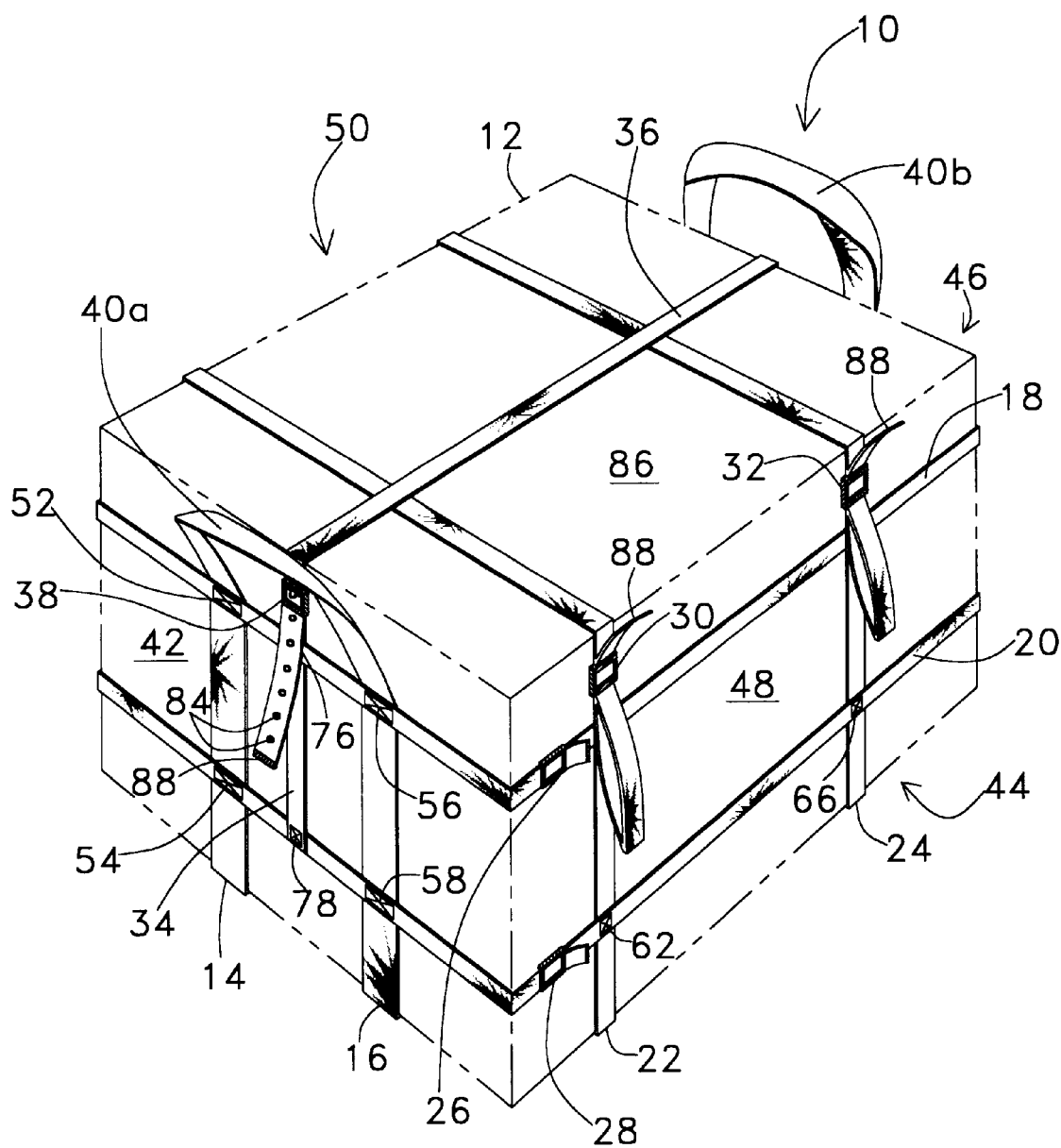
FIG. 1 is a perspective view of an apparatus for securing and carrying box-shaped cargo in accordance with the present invention, shown secured around a box depicted in phantom.
Figure 2:
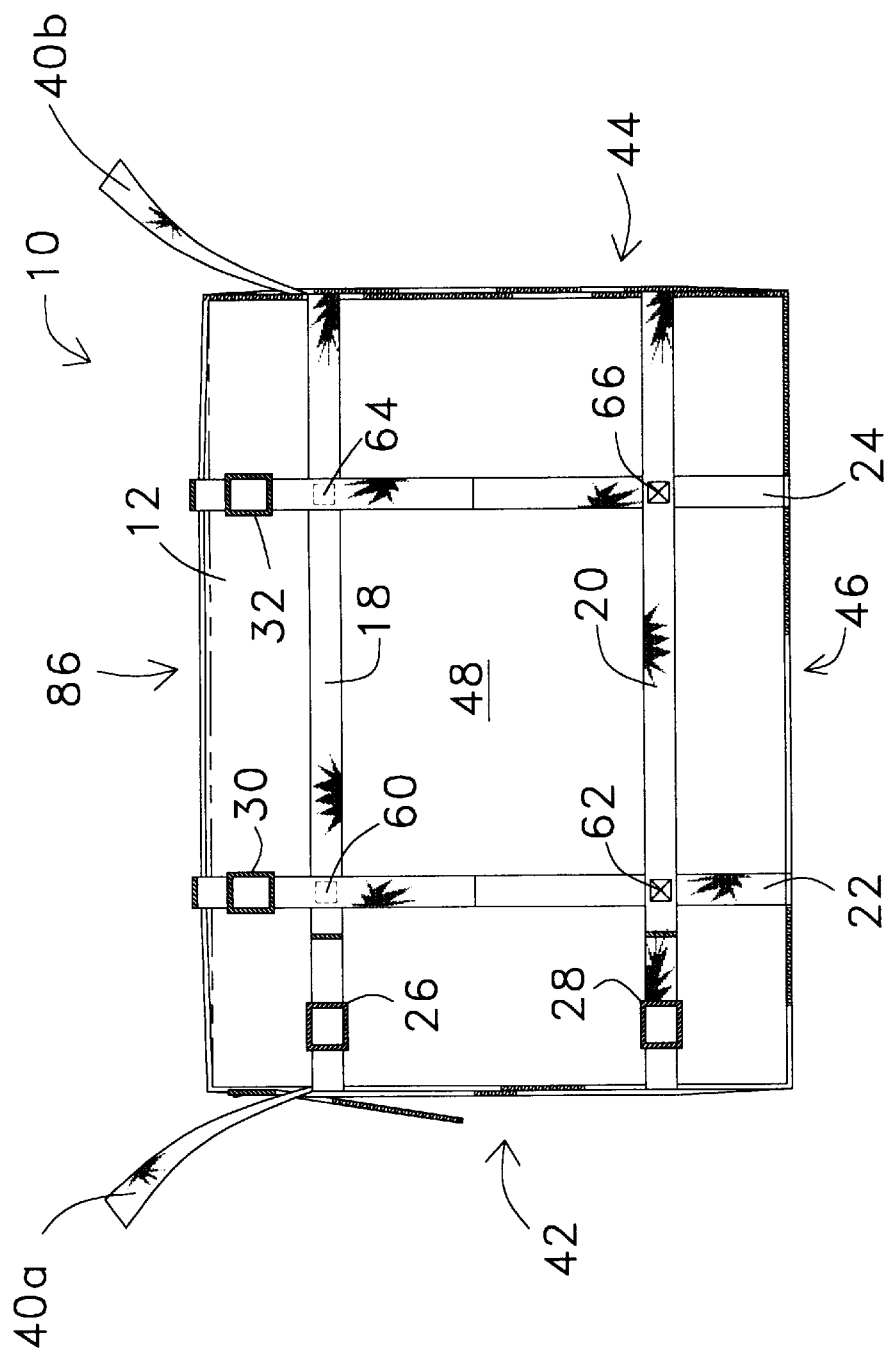
FIG. 2 is a front view of the apparatus shown in FIG. 1.
Figure 3:
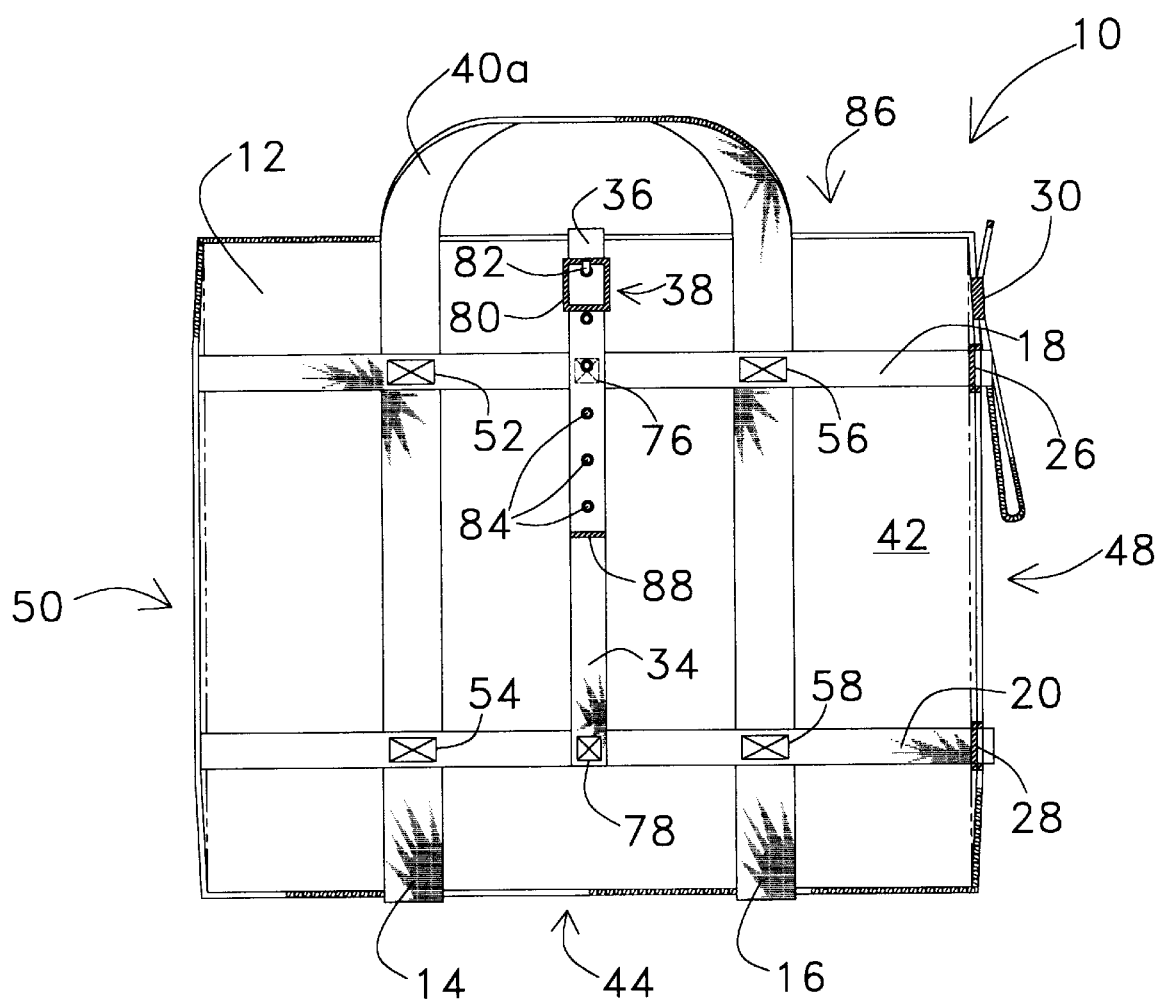
FIG. 3 is side view of the apparatus shown in FIG. 1.
Figure 4:
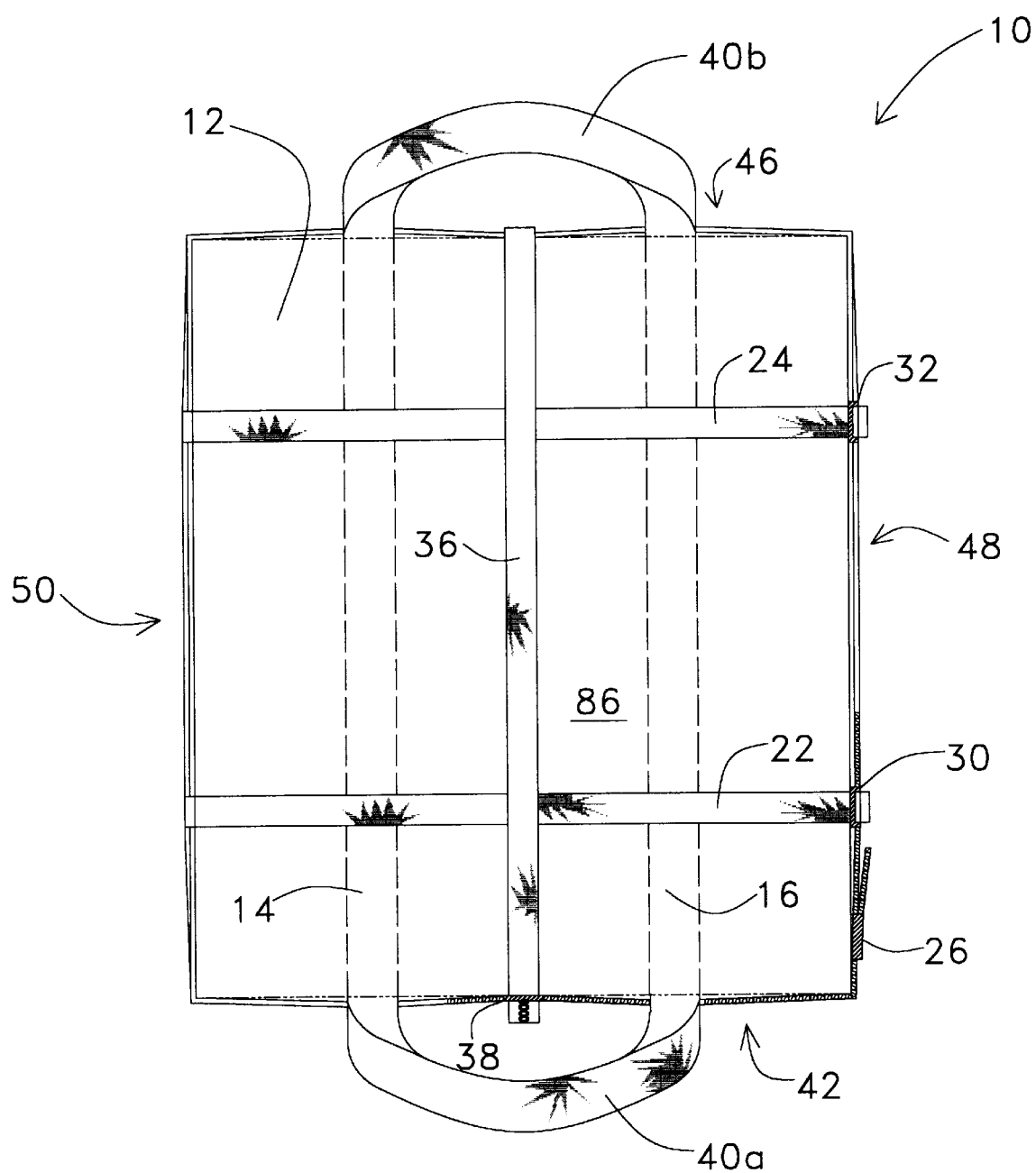
FIG. 4 is a top plan view of the apparatus shown in FIG. 1.

Referring more specifically to the drawings, for illustrative purposes the present invention is embodied in the apparatus generally shown in FIG. 1 through FIG. 5. It will be appreciated that the apparatus may vary as to configuration and as to details of the parts without departing from the basic concepts as disclosed herein.

Referring to FIG. 1 through FIG. 5, an apparatus 10 for securing and carrying box-shaped cargo, in accordance with the present invention, is generally shown. Apparatus 10 is adapted to facilitate securing and carrying a box 12, which is herein depicted in phantom. Apparatus 10 generally comprises a first retaining strap 14, a second retaining strap 16, a first horizontally disposed strap 18, a second horizontally disposed strap 20, a first securing strap 22, a second securing strap 24, a first slide fastener 26, a second slide fastener 28, a third slide fastener 30, and a fourth slide fastener 32. Apparatus 10 may further include a first cross strap 34, a second cross strap 36, a buckle assembly 38, and a pair of handles 40a and 40b.

In the preferred embodiment of the invention, first and second retaining straps 14 and 16, first and second horizontally disposed straps 18 and 20, first and second securing straps 22 and 24, and first and second cross straps 34 and 36 are fabricated from polyurethane-coated nylon web material. It is contemplated, however, other like materials that are water-resistant, tough, flexible, and widely available, may also be used. Such material may include, but is not limited to, canvas, polyester, nylon, elastic and leather.

First retaining strap 14 and second retaining strap 16 are maintained in a spaced-apart relationship relative to each other and in a generally parallel orientation. When apparatus 10 is secured around box 12, first retaining strap 14 and second retaining strap 16 support the left side 42, the bottom 44, and the right side 46 of box 12.

First horizontally disposed strap 18 and second horizontally disposed strap 20 are also maintained in a spaced-apart relationship relative to each other and in a generally parallel orientation. When apparatus 10 is secured around box 12, first horizontally disposed strap 18 and second horizontally disposed strap 20 support left side 42, the front side 48, right side 46, and the rear side 50 of box 12. First slide fastener 26 is provided on first horizontally disposed strap 18, thereby allowing first horizontally disposed strap 18 to form an adjustable horizontally-biased loop capable of surrounding box 12. Second slide fastener 28 is provided on second horizontally disposed strap 20, thereby allowing second horizontally strap 20 to also form an adjustable horizontally-biased loop capable of surrounding box 12.

First securing strap 22 and second securing strap 24 are also maintained in a spaced-apart relationship relative to each other and in a generally parallel orientation. When apparatus 10 is secured around box 12, first securing strap 22 and second securing strap 24 support front side 48, bottom 44, and rear side 50 of box 12. Third slide fastener 30 is provided on first securing strap 22, thereby allowing first securing strap 22 to form an adjustable, vertically-biased loop capable of surrounding box 12. Fourth slide fastener 32 is provided on second securing strap 24, thereby allowing second securing strap 24 to also form an adjustable, vertically-biased loop capable of surrounding box 12.

Slide fasteners 26, 28, 30, and 32 may be any of the commonly known and available types that are made of metal or plastic used for attaching the ends of a strap together. An essential attribute of slide fasteners 26, 28, 30, and 32 is that they be capable of holding a strap in static position under relatively high tensile loading conditions imposed on straps 14, 16, 18, 20, 22, 24, 34, and 36. Those skilled in the art will appreciate that alternatives to slide fasteners 26, 28, 30 and 32 may be employed, such as but not limited to, hook and loop fasteners, buckle assemblies, and the like.

First retaining strap 14 and first horizontally disposed strap 18 are attached to each other in a generally perpendicular orientation, at attachment point 52 that would abut left side of box 12, and also at an attachment point (not shown) that would abut right side 46 of box 12, in approximately a symmetric position relative to attachment point 52 when box 12 is secured thereon. First retaining strap 14 and second horizontally disposed strap 20 are attached to each other in a generally perpendicular orientation, at attachment point 54 that would also abut left side of box 12, and also at an attachment point (not shown) that would abut right side 46 of box 12, in approximately a symmetric position relative to attachment point 54 when box 12 is secured thereon. Similarly, second retaining strap 16 and first horizontally disposed strap 18 are attached to each other in a generally perpendicular orientation, at attachment point 56 that would abut left side of box 12, and also at an attachment point (not shown) that would abut right side 46 of box 12, in approximately a symmetric position relative to attachment point 56 when box 12 is secured thereon. Second retaining strap 16 and second horizontally disposed strap 20 are attached to each other in a generally perpendicular orientation, at attachment point 58 that would also abut left side of box 12, and also at an attachment point (not shown) that would abut right side 46 of box 12, in approximately a symmetric position relative to attachment point 58 when box 12 is secured thereon.

First securing strap 22 is attached to first horizontally disposed strap 18 in a generally perpendicular orientation, at attachment point 60 that would abut front side 48 of box 12, and also at attachment point (not shown) that would abut rear side 50 of box 12, in approximately a symmetric position relative to attachment point 60. First securing strap 22 is attached to second horizontally disposed strap 20 in a generally perpendicular orientation, at attachment point 62 that would abut front side 48 of box 12, and also at attachment point (not shown) that would abut rear side 50 of box 12, in approximately a symmetric position relative to attachment point 60 when box 12 is secured thereon. Similarly, second securing strap 24 is attached to first horizontally disposed strap 18 in a generally perpendicular orientation, at attachment point 64 that would abut front side 48 of box 12, and also at attachment point (not shown) that would abut rear side 50 of box 12, in approximately a symmetric position relative to attachment point 64. Second securing strap 24 is attached to second horizontally disposed strap 20 in a generally perpendicular orientation, at attachment point 66 that would abut front side 48 of box 12, and also at attachment point (not shown) that would abut rear side 50 of box 12, in approximately a symmetric position relative to attachment point 66 when box 12 is secured thereon.

Figure 5:
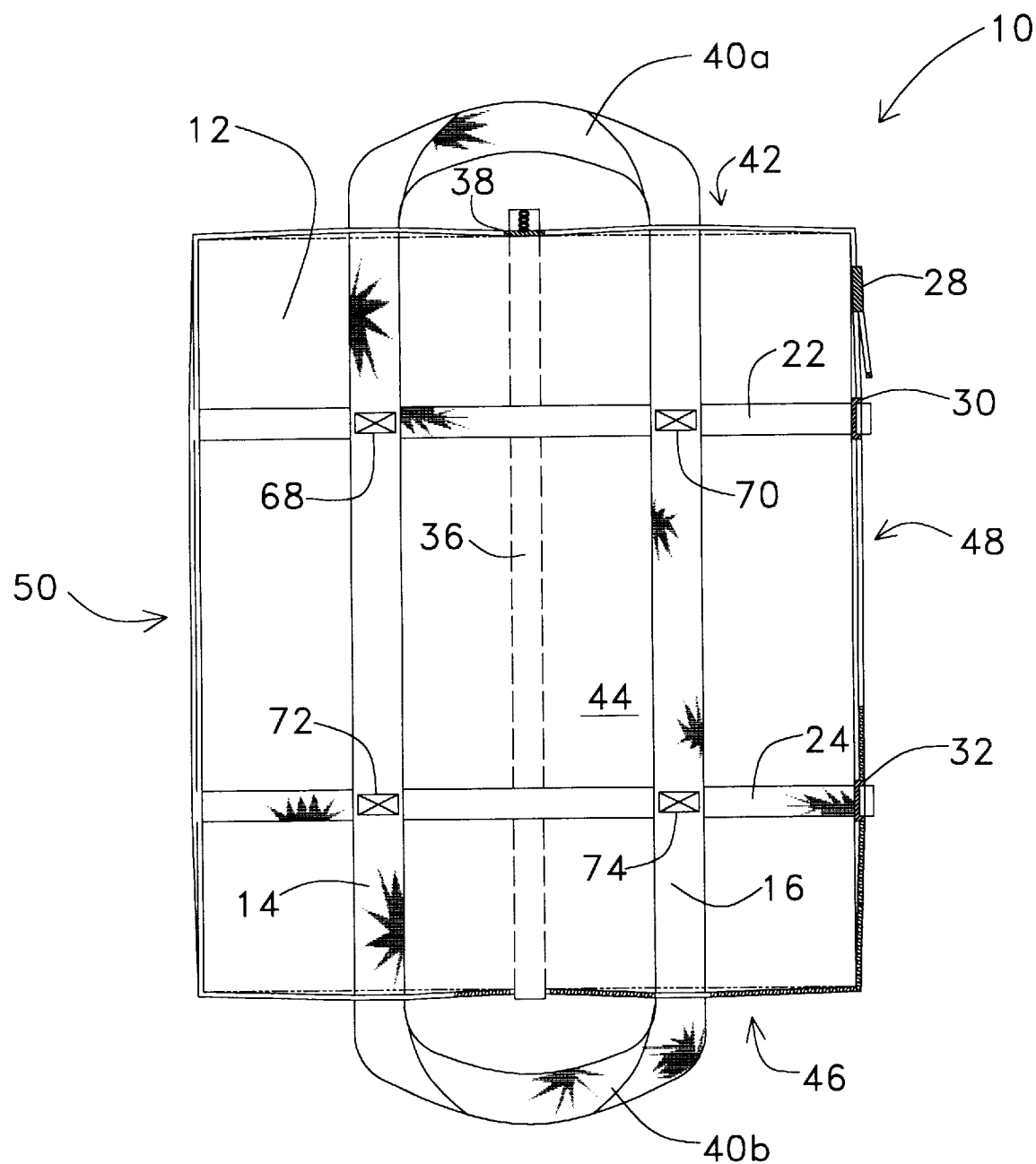
FIG. 5 is a bottom view of the apparatus shown in FIG. 1.

It can be seen in FIG. 5 that first securing strap 22 is attached to first retaining strap 14 in a generally perpendicular orientation, at attachment point 68 that would abut bottom 44 of box 12, and first securing strap 22 is also attached to second retaining strap 16 in a generally perpendicular orientation, at attachment point 70 that would also abut bottom 44 of box 12 when box 12 is secured thereon. Similarly, second securing strap 24 is attached to first retaining strap 14 in a generally perpendicular orientation, at attachment point 72 that would abut bottom 44 of box 12, and second securing strap 24 is also attached to second retaining strap 16 in a generally perpendicular orientation, at attachment point 74 that would also abut bottom 44 of box 12 when box 12 is secured thereon.

First cross strap 34 is positioned approximately midway between first retaining strap 14 and second retaining strap 16 abutting left side 42 of box 12 and is attached to first horizontally disposed strap 18 at attachment point 76, as well as to second horizontally disposed strap 20 at attachment point 78. Second cross strap 36 is positioned approximately midway between first retaining strap 14 and second retaining strap 16 abutting right side 46 of box 12 and is attached to first horizontally disposed strap 18, as well as to second horizontally disposed strap 20, at attachment points (not shown) that lie in approximately symmetric positions relative to attachment points 76 and 78, respectively, when box 12 is secured thereon.

First cross strap 34 may be adjustably attached to second cross strap 36 by buckle assembly 38 that includes a buckle frame 80 and pin 82 on first cross strap 34, and a plurality of eyelets 84 on second cross strap 36. Eyelets 84 engage pin 82 to connect first cross strap 34 and second cross strap 36 together. When attached to first cross strap 34, second cross strap 36 would perpendicularly intersect both first securing strap 22 and second securing strap 24 adjacent the top surface 86 of box 12 when box 12 is secured thereon. Those skilled in the art will appreciate that alternatives to buckle assembly 38 may be employed, such as but not limited to hook and loop fasteners, slide fasteners, and the like.

All the attachment points used in the preferred embodiment of the invention are stitched. Double stitching and reinforcing tape may be incorporated for added strength and durability. It is contemplated, however, that other means of attaching straps, that are commonly known and used by those skilled in the art, may also be used to secure attachment points. To prevent fraying of the strap ends and to ease insertion into slide fasteners 26, 28, 30 and 32, the strap ends may incorporate aglets 88.

It is also contemplated that attachment points 60, 62, 64, 66, that abut front side 48 of box 12, as well as the corresponding attachment points that abut rear side 50 of box 12, and the attachment points 52, 54, 56, 58 that abut left side 42 of box 12, as well as the corresponding attachment points that abut right side 44 of box 12, wherein a vertical strap component may be adjusted, may be adjusted in a horizontal direction, and a horizontal strap component may be adjusted in a vertical direction. This allows for all the attachment points to always be positioned generally in an evenly spaced-apart relationship relative to each other on the surface of the box they support.

Having described the structure of apparatus 10, the function of apparatus 10 is hereinafter described. To secure box 12, or like shaped item for carrying using apparatus 10, box 12 is inserted into the loops formed by first horizontal strap 18 and second horizontal strap 20, which also encompasses the space between handles 40a and 40b. The insertion of box 12 may be accomplished when first securing strap 22 is uncoupled from third slide fastener 30 and second securing strap 24 is uncoupled from fourth slide fastener 32. Also, second cross strap 36 must be detached from buckle assembly 38. As box 12 is inserted therethrough, it comes to rest on first and second retaining straps 14 and 16, as well as on first and second securing straps 22 and 24, which provide support for box 12. First securing strap 22 and second securing strap 24 are then inserted through slide fasteners 30 and 32, respectively, and tightened securely. Next, the loops formed by the first and second horizontally disposed straps 18 and 20, respectively, are also tightened securely. Finally, second cross strap 36 is inserted into buckle assembly 38 for engagement thereto and tightened securely using the most appropriate eyelet 84, whereupon box 12 is now secured to apparatus 10 and may be easily carried and transported using handles 40a and 40b.

Accordingly, it will be seen that this invention provides for relatively simple, lightweight, and economical means for securing, handling, carrying, and transporting a variety of sizes of box-shaped cargo. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for securing and carrying a box, comprising:

(a) a first and a second retaining strap, said first and said second retaining straps are spaced apart from each other in a generally parallel orientation;

(b) a first and a second horizontally disposed strap, said first and said second horizontally disposed straps are each spaced apart from each other in a generally parallel orientation, wherein said first retaining strap is attached to both said first and said second horizontally disposed straps in perpendicular relation, and wherein said second retaining strap is attached to both said first and said second horizontally disposed straps in perpendicular relation;

(c) a first slide fastener provided on said first horizontally disposed strap and a second slide fastener provided on said second horizontally disposed strap, whereby said first slide fastener and said second slide fastener allow for said first horizontal strap and said second horizontal strap, respectively, to each form adjustable loops;

(d) a first and a second securing strap, said first and said second securing straps are spaced apart from each other in a generally parallel orientation, wherein said first securing strap is attached to both said first and said second horizontally disposed straps and said first and second retaining straps in perpendicular relation, and wherein said second securing strap is attached to both said first and said second horizontally disposed straps and said first and second retaining straps in perpendicular relation; and (e) a third slide fastener provided on said first securing strap and a fourth slide fastener provided on said second securing strap, whereby said third slide fastener and said fourth slide fastener allow for said first securing strap and said second securing strap, respectively, to each form adjustable loops.

2. An apparatus as recited in claim 1, further comprising:

(a) a first cross strap and a second cross strap, said first cross strap attached to said first and said second horizontal straps in a generally perpendicular fashion, said second cross strap attached to said first and said second horizontal straps in a generally perpendicular fashion; and (b) a buckle assembly for adjustably connecting said first cross strap to said second cross strap.

3. An apparatus as recited in claim 1, further comprising a first handle and a second handle, said first handle and said second handle extending from said first and said second retaining straps.

4. An apparatus as recited in claim 1, wherein said first retaining strap is attached to said first horizontally disposed strap at two distinct points, wherein said first retaining strap is attached to said second horizontally disposed strap at two distinct points, wherein said second retaining strap is attached to said first horizontally disposed strap at two distinct points, and wherein said second retaining strap is attached to said second horizontally disposed strap at two distinct points.

5. An apparatus as recited in claim 1, wherein said first securing strap is attached to said first horizontally disposed strap at two distinct points, wherein said first securing strap is attached to said second horizontally disposed strap at two distinct points, wherein said second securing strap is attached to said first horizontally disposed strap at two distinct points, and wherein said second securing strap is attached to said second horizontally disposed strap at two distinct points.

6. An apparatus as recited in claim 1, wherein said second cross strap, when attached to said first cross strap, perpendicularly intersects both said first and said second securing straps.

7. An apparatus for securing and carrying a box having front, rear, left, right, bottom, and top sides, comprising:
(a) a plurality of retaining straps adapted for securement upon the left side, bottom side, and right side of the box;
(b) a plurality of securing loops for securement upon the front side, bottom side, rear side, and upper side of the box, said securing loops including means for detachment and adjustment, said securing loops attached to said retaining straps in a generally perpendicular relation, wherein attachment points for said securing loops to said retaining straps abut the bottom surface of the box when the box is secured thereon;
(c) a plurality of horizontally disposed loops for securement upon the front side, left side, rear side, and right side of the box, said horizontally disposed loops including means for detachment and adjustment, said horizontally disposed loops attached to said retaining straps and said securing loops in a generally perpendicular relation, wherein attachment points for said horizontally disposed loops to said retaining straps abut both the left surface and the right surface of the box when the box is secured thereon, and wherein attachment points for said horizontally disposed and said securing loops abut both the front side and the rear side of the box when the box is secured thereon; and
(d) a plurality of handles extending from said retaining straps.

8. An apparatus as recited in claim 7, further comprising:
(a) a first cross strap and a second cross strap, said first cross strap attached to said horizontally disposed loops in a generally perpendicular fashion, wherein attachment points for said first cross strap and said horizontally disposed loops abut the left side of the box when the box is secured thereon, and wherein attachment points for said second cross strap and said horizontally disposed loops abut the right side of the box when the box is secured thereon; and
(b) a buckle assembly for adjustably connecting said first cross strap to said second cross strap.

9. An apparatus as recited in claim 7, wherein said second cross strap, when attached to said first cross strap, perpendicularly intersects said securing loops.

10. An apparatus for securing and carrying a box having front, rear, left, right, bottom, and top sides, comprising:
(a) a first and a second retaining strap, said first and said second retaining straps are spaced apart from each other in a generally parallel orientation, said retaining straps adapted to support the left side, bottom side, and right side of the box when the box is secured thereon;
(b) a first and a second horizontally disposed strap, said first and said second horizontally disposed straps are each spaced apart from each other in a generally parallel orientation, wherein said first retaining strap is attached to both said first and said second horizontally disposed straps in perpendicular relation, and wherein said second retaining strap is attached to both said first and said second horizontally disposed straps in perpendicular relation, said horizontally disposed straps adapted to support the front side, left side, rear side, and right side of the box when the box is secured thereto;
(c) a first slide fastener provided on said first horizontally disposed strap and a second slide fastener provided on said second horizontally disposed strap, whereby said first slide fastener and said second slide fastener allow for said first horizontal strap and said second horizontal strap, respectively, to each form adjustable loops;
(d) a first and a second securing strap, said first and said second securing straps are spaced apart from each other in a generally parallel orientation, wherein said first securing strap is attached to both said first and said second horizontally disposed straps and said first and second retaining straps in perpendicular relation, and wherein said second securing strap is attached to both said first and said second horizontally disposed straps and said first and second retaining straps in perpendicular relation, said securing straps adapted to support the front side, left side, rear side, and right side of the box when the box is secured thereto; and
(e) a third slide fastener provided on said first securing strap and a fourth slide fastener provided on said second securing strap, whereby said third slide fastener and said fourth slide fastener allow for said first securing strap and said second securing strap, respectively, to each form adjustable loops;
(f) a first cross strap and a second cross strap, said first cross strap attached to said first and said second horizontal straps in a generally perpendicular fashion, said second cross strap attached to said first and said second horizontal straps in a generally perpendicular fashion;
(g) a buckle assembly for adjustably connecting said first cross strap to said second cross strap; and
(h) a first handle and a second handle, said first handle and said second handle extending from said first and said second retaining straps.

11. An apparatus as recited in claim 10, wherein said first retaining strap is attached to said first horizontally disposed strap at two distinct points, wherein said first retaining strap is attached to said second horizontally disposed strap at two distinct points, wherein said second retaining strap is attached to said first horizontally disposed strap at two distinct points, and wherein said second retaining strap is attached to said second horizontally disposed strap at two distinct points.

12. An apparatus as recited in claim 10, wherein said first securing strap is attached to said first horizontally disposed strap at two distinct points, wherein said first securing strap is attached to said second horizontally disposed strap at two distinct points, wherein said second securing strap is attached to said first horizontally disposed strap at two distinct points, and wherein said second securing strap is attached to said second horizontally disposed strap at two distinct points.

13. An apparatus as recited in claim 10, wherein said first cross strap and said second cross straps are configured such that said second cross strap perpendicularly intersects both said first and said second securing straps, when said second cross strap is attached to said first cross strap.

* * * * *